United States Patent [19]

Burger et al.

[11] Patent Number: 5,068,640
[45] Date of Patent: Nov. 26, 1991

[54] METHOD OF OPERATING A SAFETY DEVICE FOR VEHICLE OCCUPANTS

[75] Inventors: Wilfried Burger, Hemmingen; Werner Nitschke, Ditzingen; Peter Taufer, Renningen; Hugo Weller, Oberriexingen, all of Fed. Rep. of Germany

[73] Assignee: Robert Bosch GmbH, Stuttgart, Fed. Rep. of Germany

[21] Appl. No.: 466,301

[22] PCT Filed: Jun. 23, 1988

[86] PCT No.: PCT/DE88/00372
§ 371 Date: Apr. 4, 1990
§ 102(e) Date: Apr. 4, 1990

[87] PCT Pub. No.: WO89/04779
PCT Pub. Date: Jun. 1, 1989

[30] Foreign Application Priority Data

Nov. 16, 1987 [DE] Fed. Rep. of Germany .... 3738862.2

[51] Int. Cl.$^5$ .................. B60R 21/32; B60R 16/02
[52] U.S. Cl. ........................ 340/438; 73/509; 73/517 R; 180/270; 180/282; 280/735; 307/10.1; 307/121; 307/130; 324/548; 340/653; 374/141
[58] Field of Search .............. 73/865.9, 489, 495, 73/497, 509, 517 R; 324/503, 537, 548; 340/438, 457.1, 459, 635, 653, 669, 584, 587, 693; 374/141; 280/735; 180/270, 282, 283; 200/61.58 B; 307/10.1, 121, 125, 130

[56] References Cited

U.S. PATENT DOCUMENTS

| | | |
|---|---|---|
| 3,633,159 | 1/1972 | Dillman et al. ............ 280/735 |
| 3,714,627 | 1/1973 | Dillman et al. ............ 280/735 |
| 3,767,228 | 10/1973 | Lewis ........................ 280/150 |
| 3,774,151 | 11/1973 | Lewis et al. ............... 280/735 |
| 3,863,208 | 1/1975 | Belben ...................... 280/735 |
| 3,916,376 | 10/1975 | Tuttle ....................... 280/735 |
| 3,980,318 | 9/1976 | Balban ...................... 280/735 |
| 4,020,453 | 4/1977 | Spies et al. ................ 280/735 |
| 4,117,730 | 10/1978 | Spies et al. ................ 73/517 R |
| 4,243,771 | 1/1981 | Suchowerskyj et al. .... 340/438 |
| 4,608,501 | 8/1986 | Andres et al. ............. 180/282 |
| 4,835,513 | 5/1989 | McCurdy et al. .......... 280/735 X |
| 4,933,570 | 6/1990 | Swert et al. ............... 280/735 X |
| 4,974,873 | 12/1990 | Keiguchi et al. .......... 280/735 |

FOREIGN PATENT DOCUMENTS

| | | |
|---|---|---|
| De 2851333 | 6/1280 | Fed. Rep. of Germany ...... 60 R/21/10 |
| 2021475 | 11/1971 | Fed. Rep. of Germany . |
| 3729785 | 2/1989 | Fed. Rep. of Germany . |
| 2267221 | 11/1975 | France .................. 60 R/ |
| 55130 | 5/1977 | Japan .................... 280/735 |
| 16232 | 2/1978 | Japan .................... 180/282 |

Primary Examiner—Tom Noland
Attorney, Agent, or Firm—Kenyon & Kenyon

[57] ABSTRACT

A safety device for vehicle occupants has an operational voltage source, typically the vehicle's battery, and a storage device for electrical energy, typically a capacitor. Several tripping devices, typically ignition tablets, are coupled to the storage device and/or the operational voltage source, for actuating inertial restraining devices, such as airbags, belt tighteners or the like. If the storage device fails, each tripping device is connected for a specified period of time to the operational voltage source by a respective switch. Each switch is triggered by an evaluating device. Therefore, if the storage device fails, as long as the operational voltage source is connected to the safety device, each tripping device and, therefore, inertial restraining device can be actuated.

19 Claims, 3 Drawing Sheets

METHOD OF OPERATING A SAFETY DEVICE FOR VEHICLE OCCUPANTS

FIELD OF THE INVENTION

The present invention relates to safety devices for motor vehicles and, in particular, to methods and apparatus for actuating passenger restraint devices, such as air bags and seat belt tighteners.

BACKGROUND INFORMATION

A safety device for vehicle occupants is shown in DE-A-28 51 333. A device for storing electrical energy is provided for safety reasons. Electrically actuated tripping devices actuate the safety device if, for example, the connection to the main source of energy of the vehicle, typically the vehicle battery, is interrupted.

Ignition tablets, which are electrically actuated, are frequently used as tripping devices. The electric current flowing through an ignition tablet generates heat which, in turn, initiates a pyrotechnical reaction. One problem with ignition tablets, however, is that after ignition occurs, they are prone to shunts. A shunt can drain the limited energy reserve of the storage device. As a result, the amount of available energy is frequently insufficient to actuate additional tripping devices necessary to successively trip corresponding inertial restraining devices.

German Patent Application P 37 29 785.6 suggests measuring the energy supplied to a tripping device after it is actuated with an evaluating device, and then interrupting the energy supply to that tripping device if a specified energy limit value is reached. However, if the storage device for electrical energy is defective, the evaluating device can incorrectly calculate the available energy of the storage device. As a result, the evaluating device can interrupt the flow of electric current to the ignition tablet before it is ignited.

SUMMARY OF THE INVENTION

The present invention is directed to a method of actuating a safety device for a motor vehicle. The safety device includes an electric storage device coupled to a voltage source. Both the electric storage device and the voltage source are coupled to tripping devices for actuating inertial restraining devices on the motor vehicle. The method comprises the following steps: monitoring the electric storage device to determine if it is defective; if the storage device is defective, interrupting the flow of electric current from the storage device to the tripping devices; and directing electric current from the voltage source to at least one tripping device for a predetermined period of time to actuate the respective tripping device.

In one method of the present invention, the predetermined period of time is the same for each tripping device. In another method of the present invention, the predetermined period of time is varied depending upon the respective tripping device to be actuated. One method of the present invention further comprises the steps of measuring the ambient temperature of the safety device; and basing the predetermined period of time on the temperature measurement.

The present invention is also directed to a safety device for actuating a plurality of inertial restraining devices on a motor vehicle. The safety device comprises a voltage source and an electric storage device coupled to the voltage source to receive electric energy therefrom. A plurality of tripping devices are each coupled to the voltage source, the electric storage device, and to a respective inertial restraining device. Each tripping device is actuated to in turn actuate a respective inertial restraining device, by passing electric current from either the voltage source or the electric storage device therethrough.

The safety device further comprises an acceleration sensor for generating output signals indicative of the acceleration of the vehicle. An evaluating device is coupled to the acceleration sensor and to the tripping devices. The evaluating device is adapted to control the flow of electric current to each respective tripping device in response to the output signals generated by the acceleration sensor. The evaluating device is also coupled to the voltage source and to the electric storage device. The evaluating device is further adapted to determine whether the electric storage device is defective, and to disconnect the electric storage device from the inertial restraining devices in response thereto. A plurality of timing elements are each coupled between the evaluating device and a respective tripping device. Each timing element permits electric current to pass through the respective tripping device for a predetermined period of time to actuate the tripping device.

One safety device of the present invention further comprises a temperature sensor coupled to the evaluating device and to the timing elements. The temperature sensor generates output signals indicative of the ambient temperature thereof. The timing elements are adapted to permit electric current to flow through the respective tripping elements for a predetermined period of time based thereon.

One advantage of the method and apparatus of the present invention is that the safety device for vehicle occupants can operate reliably, even when the storage device is defective. Because each tripping device is coupled to the vehicle battery for a specified period of time, the present invention ensures that the tripping devices obtain the electrical energy necessary for activation.

Other advantages of the apparatus and method of the present invention will become apparent in view of the following detailed description and drawings taken in connection therewith.

DETAILED DESCRIPTION

Figure 2:
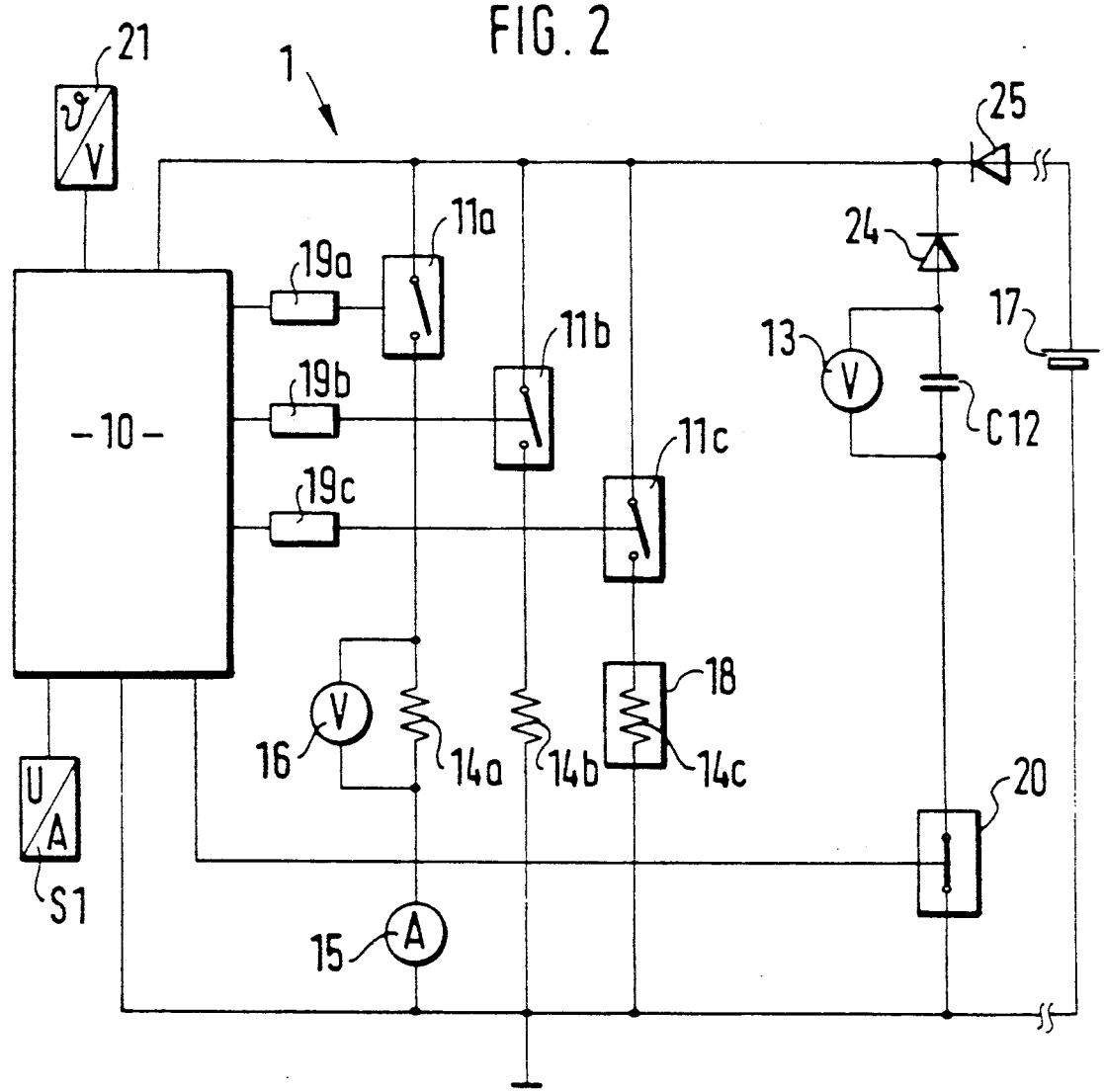
FIG. 2 is a schematic illustration of a safety device embodying the present invention.

In FIG. 2, a safety device for vehicle occupants embodying the present invention is indicated generally by the reference numeral 1. The safety device 1 comprises an acceleration sensor S1 coupled to an evaluating device 10, both known to those skilled in the art. The output signals generated by the sensor S1 are either proportional to the acceleration of the vehicle (not shown) or are generated when a predetermined acceleration threshold is exceeded. The output signals are transmitted to the evaluating device 10, which analyzes the signals to determine if an accident has occurred.

Connected to and actuated by the evaluating device 10 are switches 11a, 11b and 11c. The tripping devices, which are each coupled in series with a respective switch 11a, 11b or 11c, can then be connected to the positive lead of an operational voltage source 17, preferably the vehicle battery, by closing the respective switch. The tripping devices are preferably ignition tablets, as described further below. A storage device C12, preferably a capacitor, is provided for electrical energy, and is coupled in parallel to the operational voltage source 17. The storage device C12 can be disconnected from the voltage source 17 by opening a switch element 20 or, alternatively, by diodes D24, D25 coupled between the storage device C12 and voltage source 17.

Timing elements 19a, 19b and 19c are coupled between the switches 11a, 11b and 11c, respectively, and the evaluating device 10. The timing elements, which are controlled by the evaluating device 10, determine how long the respective switches 11a, 11b and 11c remain closed. Although the timing elements 19a, 19b and 19c are illustrated as separate components from the evaluating device 10, they can also be incorporated within the evaluating device 10, in a manner known to those skilled in the art.

A temperature sensor 21 is also coupled to the evaluating device 10. The temperature sensor 21 detects the ambient temperature and converts the temperature measurement into a voltage signal, for example, which is proportional to the temperature measurement. Inertial restraining devices 18 (only one shown) are each coupled to a respective tripping device 14a, 14b, and 14c. The inertial restraining devices 18 can be airbags, belt tighteners or the like.

When a switch 11a, 11b or 11c is actuated by the evaluating device 10, an electric circuit is closed. Electric current therefore flows through the respective tripping device 14a, 14b or 14c. The tripping devices are preferably ignition tablets, which are heated intensely by the passage of electric current therethrough, and thus initiate a pyrotechnical chain of ignition. The pyrotechnical chain of ignition produces a gas which, in turn, rapidly inflates the air bag 18, for example.

The storage device C12, which is independent of the operational voltage source 17, is provided for safety reasons. An electrical energy reserve is stored within the storage device C12 for actuating the tripping devices 14a, 14b and/or 14c. The storage device C12 is used, for example, if the connection between the safety device 1 and the operational voltage source 17 is cut-off in the event of a vehicle accident. Conventional safety devices typically employ a capacitor as the storage device C12, which has a limited capacitance. Therefore, only a limited amount of energy can be stored in the storage device C12.

The safety device 1 further comprises a first volt meter 13, electrically coupled to the storage device C12, and to the evaluating device 10. The volt meter 13 generates output signals indicative of the voltage across the storage device C12. Several second volt meters 16 (only one shown) are each electrically coupled to a respective tripping device 14a, 14b or 14c, and to the evaluating device 10. The volt meters 16 each generate output signals indicative of the voltage across the respective tripping device. Several amp meters 15 (only one shown) are each electrically coupled in series with a respective tripping device 14a, 14b or 14c, and also electrically coupled to the evaluating device 10. Each amp meter 15 generates output signals indicative of the electric current flowing through the respective ignition tablet 14a, 14b, or 14c.

It has been discovered that one disadvantage of conventional safety devices that use ignition tablets as tripping devices, is that the ignition tablets are prone to shunts. Typically, when an ignition tablet is ignited it is destroyed, and thus the flow of electric current therethrough is interrupted. However, if the ignition tablet shunts, a comparatively small residual resistance can remain intact. The residual resistance can maintain a closed electric circuit and, as a result, drain the energy from the storage device C12.

This is extremely disadvantageous and harmful to the operational reliability of the safety device 1, particularly when several ignition tablets coupled to respective inertial restraining devices are to be activated one after the other, with spaced time intervals therebetween. A shunt arising from an activated ignition tablet can consume the energy stored within the storage device C12, so that an insufficient amount of energy is available to activate the other ignition tablets.

German Patent Application P 37 29 785.6 suggests overcoming this problem by measuring the energy supplied to a tripping device after it is actuated, and by interrupting the energy supplied to that tripping device after a specified energy limit value is reached. This solution works well as long as the storage device C12 is not defective.

In a normal operating state, the storage device C12 is charged by an interconnected voltage transformer (not shown), for example, to a higher potential than the operational voltage source 17. Therefore, when a tripping device is activated, energy is typically drawn first from the storage device C12. If during the course of activation, the electric potential of the storage device C12 falls below that of the operational voltage source 17, the latter supplies the energy necessary for activating the tripping devices. However, if the storage device C12 is defective, the evaluating device 10 can measure the energy supplied to the tripping devices incorrectly. As a result, the evaluating device 10 can interrupt the flow of electric current through a respective tripping device from the operational voltage source 17, before the tripping device is ignited.

Figure 1:
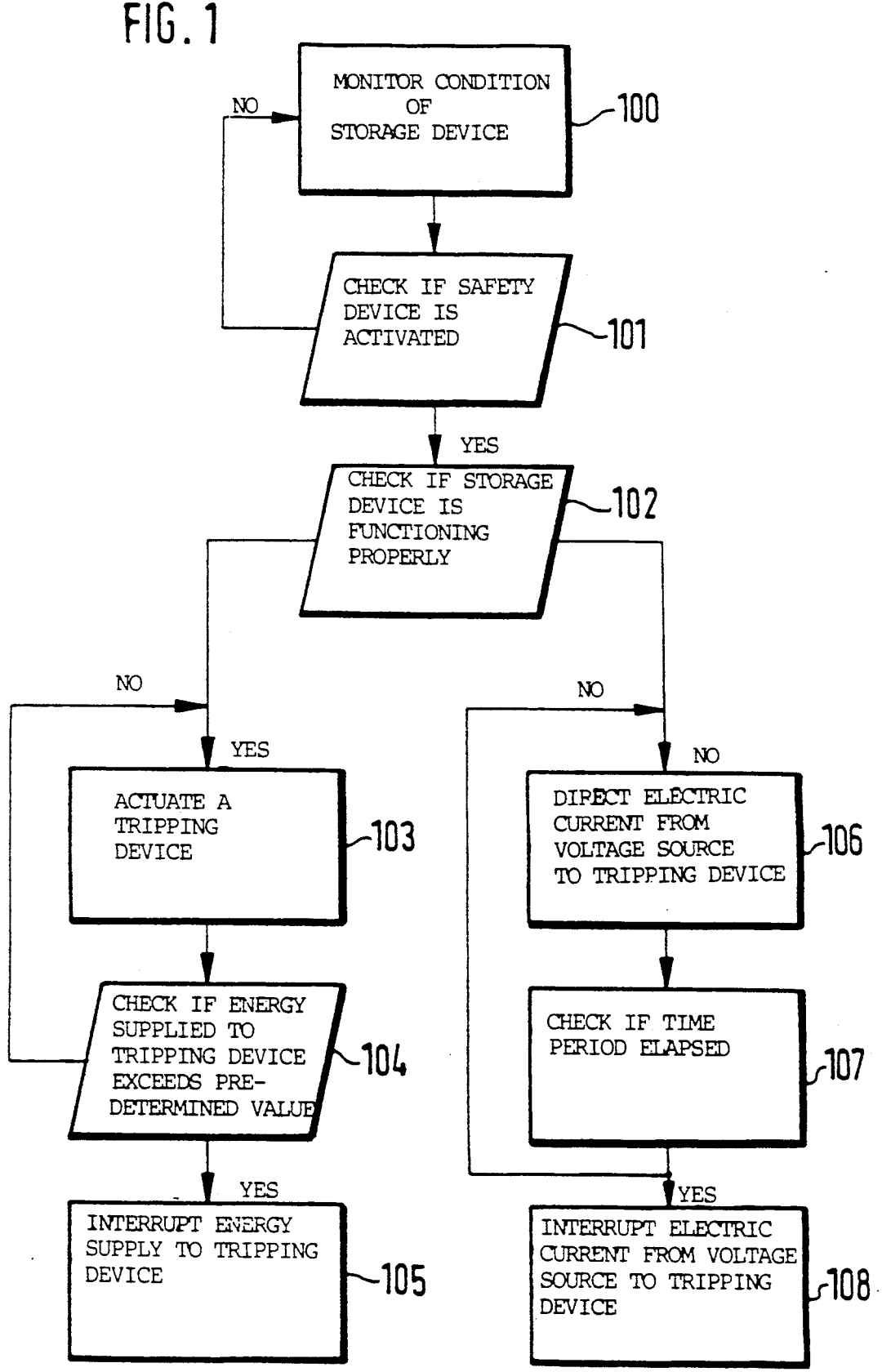
FIG. 1 is a flow chart illustrating conceptually the steps of the method of the present invention.

This disadvantage is overcome by the method and apparatus of the present invention, which is hereinafter further described with reference to the flow chart of FIG. 1. The condition of the storage device C12 is monitored by measuring the voltage V across the storage device with the volt meter 13, for example, as indicated by the process step 100. The evaluating device 10 then checks if the safety device 1 is to be activated based on output signals generated by the acceleration sensor S1, as indicated by the process step 101. If the safety device 1 is not to be activated, then the process step 100 is repeated. When the evaluating device 10 determines that the safety device is to be activated (process step 101), it checks again if the storage device C12 is functioning properly, as indicated by the process step 102.

Figure 3:
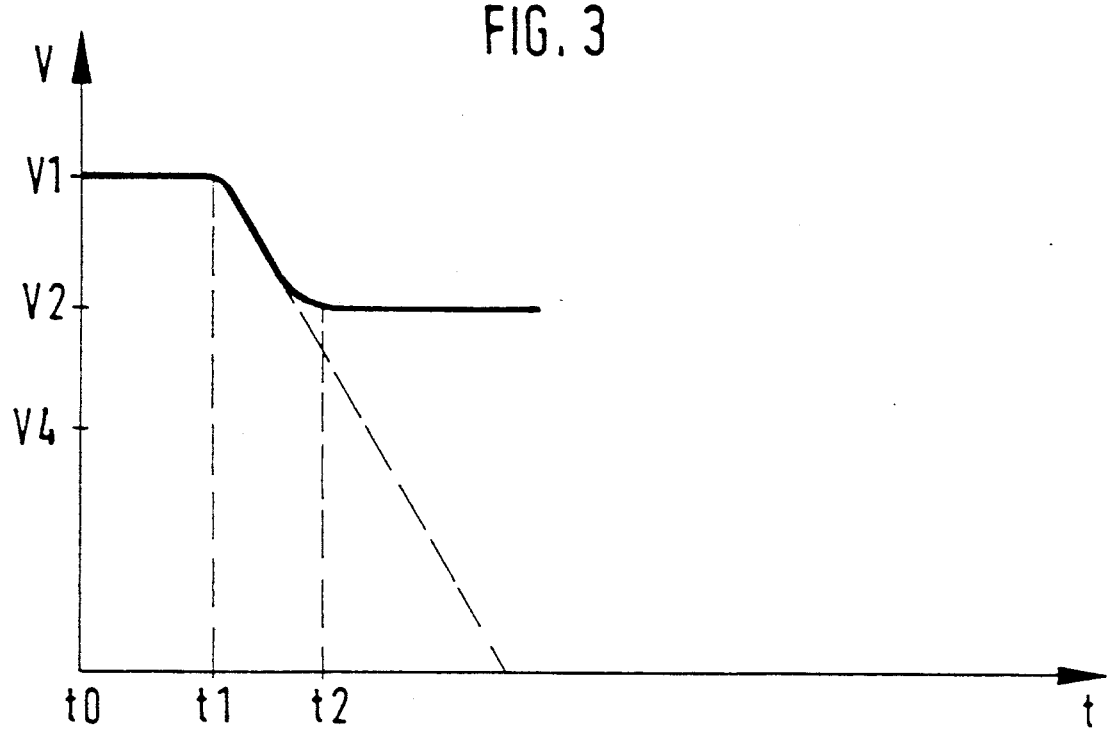
FIG. 3 is a graph illustrating the voltage across the storage device of the safety device of FIG. 2 with respect to time.

If the storage device C12 is functioning properly, energy from the storage device is directed through the closed switch 11a, for example, to the tripping device 14a, as indicated by the process step 103. At the instant the switch 11a is closed, which corresponds to the time instant t1 in FIG. 3, the voltage across the storage device C12 is at a level V1. However, the flow of electric current through the closed switch 11a and tripping device 14a causes the voltage V across the storage device C12 to drop to a level V2 at time instant t2, as shown in FIG. 3.

The evaluating device 10 constantly checks the amount of energy supplied to the tripping device 14a to actuate that device, as indicated by process step 104. So long as the the tripping device 14a is not actuated, the process step 103 is repeated. However, as soon as the evaluating device 10 determines that the amount of energy supplied to the tripping device 14a exceeds a predetermined threshold level, as indicated by the respective amp meter 15 and/or volt meter 16, the flow of electric current from the storage device C12 thereto is interrupted, as indicated by the process steps 104 and 105. Therefore, as illustrated in FIG. 3, at time instant t2, the voltage across the storage device C12 is maintained at a level V2.

Figure 4:
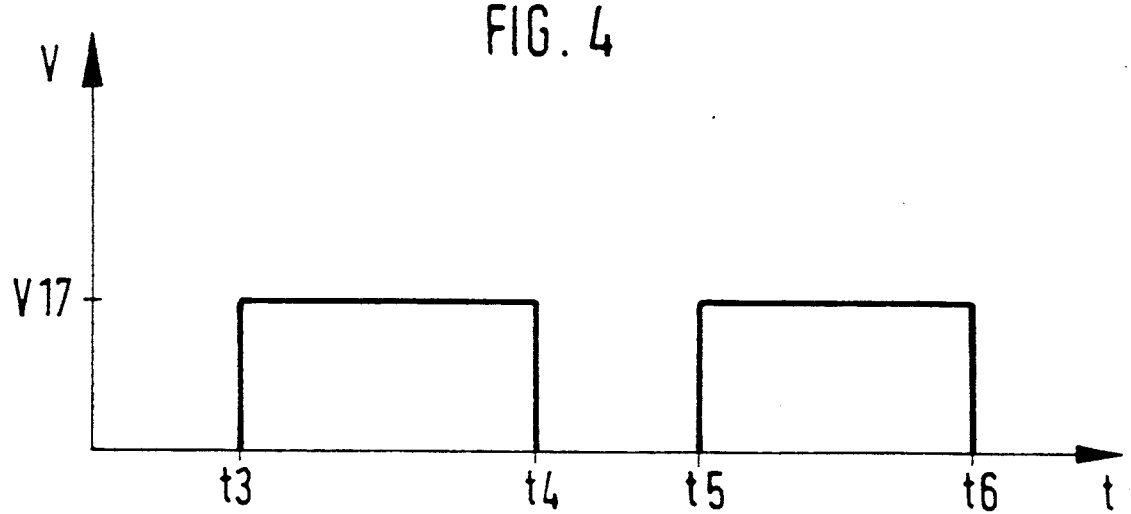
FIG. 4 is a graph illustrating the voltage across the operational voltage source of the safety device of FIG. 2 with respect to time.

For purposes of illustration, it is assumed that after the tripping device 14a is activated, the storage device C12 fails before the tripping devices 14b and 14c can be activated. In this case, the evaluating device 10 cuts-off the storage device C12 from the other components of the safety device 1 by opening the switch 20, or automatically by means of diodes D24, D25, so that only the operational voltage source 17 (the vehicle battery) is available as an energy supply for the tripping devices 14b and 14c, as indicated by the process step 106 of FIG. 1. Therefore, at time instant t3, as shown in FIG. 4, the evaluating device 10 triggers the switch 11b. The tripping device 14b in turn receives electric current from the operational voltage source 17 to be actuated.

The triggering of the switch 11b is accomplished by the timing element 19b, which maintains the switch element 11b in a closed position for a predetermined period of time extending from time instant t3 to t4, as illustrated in FIG. 4. The evaluating device 10 then constantly checks if the specified time interval has elapsed, as indicated by the process step 107. As long as the specified time period has not elapsed, the process step 106 is repeated. Energy from the operational voltage source 17 is therefore constantly supplied to the tripping device 14b.

The voltage across the operational voltage source 17 is normally at a level V17, as illustrated in FIG. 4. However, as soon as the evaluating device 10 determines that the specified time interval has expired, (at time instant t4 in FIG. 4), the switch element 11b is opened so that the tripping device 14b is cut-off from the operational voltage source 17, as indicated by the process step 108.

Thus, pursuant to the method and apparatus of the present invention, an adequate amount of energy is always supplied to the tripping device 14b by controlling the length of time that it is activated. This is accomplished even when the storage device C12 is defective, as long as the operational voltage source 17 is coupled to the other components of the safety device 1. In the same manner, the tripping device 14c is activated at time instant t5 by triggering the switch 11c. Energy is therefore supplied to the tripping device 14c during the time interval t5 to t6, as illustrated in FIG. 4.

In one embodiment of the present invention, the time intervals for triggering the tripping devices 14a, 14b and 14c can be variably specified. Therefore, if necessary, varying amounts of energy can be supplied to the different tripping devices.

In a further embodiment of the present invention, environmental conditions, in particular the ambient temperature, can be taken into consideration when the energy supply of the voltage source C12 is measured. Therefore, if a capacitor is used as the storage device C12, its temperature dependence can be accounted for. As described above, the temperature sensor 21 is connected to the evaluating device 10, as shown in FIG. 2, to determine the ambient temperature. The temperature sensor 21 converts the measured ambient temperature into a temperature-proportional voltage signal, for example, which can be processed by the evaluating device 10 to more accurately determine the voltage across the capacitor C12.

We claim:

1. A method of actuating a safety device for a motor vehicle, the safety device including an electric storage device coupled to a voltage source, both the electric storage device and the voltage source being coupled to tripping devices for actuating restraining devices on the motor vehicle, comprising the following steps:

monitoring the electric storage device to determine if it is defective;

if the storage device is defective, interrupting the flow of electric current from the storage device to the tripping devices; and directing electric current from the voltage source to at least one tripping device for a predetermined period of time to actuate the respective tripping device.

2. A method as defined in claim 1, wherein the predetermined period of time is the same for each tripping device.

3. A method of actuating a safety device for a motor vehicle, the safety device including an electric storage device coupled to a voltage source, both the electric storage device and the voltage source being coupled to tripping devices for actuating restraining devices on the motor vehicle, comprising the following steps:

monitoring the electric storage device to determine if it is defective;

if the storage device is defective, interrupting the flow of electric current from the storage device to the tripping devices; and directing electric current from the voltage source to at least one tripping device for a predetermined period of time to actuate the respective tripping device, wherein the predetermined period of time is varied depending upon the respective tripping device to be actuated.

4. A method as defined in claim 3, further comprising the following steps:

measuring the ambient temperature of the safety device; and basing the predetermined period of time on the temperature measurement.

5. A safety device for actuating a plurality of restraining devices on a motor vehicle, comprising:

a voltage source;

an electric storage device coupled to the voltage source to receive electric energy therefrom;

a plurality of tripping devices, each tripping device being coupled to the voltage source, the electric storage device, and to a respective restraining device, each tripping device being actuated to in turn actuate a respective restraining device by passing electric current from either the voltage source or the electric storage device therethrough;

an acceleration sensor for generating output signals indicative of the acceleration of the vehicle;

an evaluating device coupled to the acceleration sensor and to the tripping devices, the evaluating device being adapted to control the flow of electric current to each respective tripping device in response to the output signals generated by the acceleration sensor, the evaluating device also being coupled to the voltage source and to the electric storage device, the evaluating device being further adapted to determine whether the electric storage device is defective, and to disconnect the electric storage device from the restraining devices in response thereto; and a plurality of timing elements, each timing element being coupled between the evaluating device and a respective tripping device, each timing element permitting electric current to pass to the respective tripping device for a predetermined period of time to actuate the tripping device.

6. A safety device for actuating a plurality of restraining devices on a motor vehicle, comprising:

a voltage source;

an electric storage device coupled to the voltage source to receive electric energy therefrom;

a plurality of tripping devices, each tripping device being coupled to the voltage source, the electric storage device, and to a respective restraining device, each tripping device being actuated to in turn actuate a respective restraining device by passing electric current from either the voltage source or the electric storage device therethrough;

an acceleration sensor for generating output signals indicative of the acceleration of the vehicle;

an evaluating device coupled to the acceleration sensor and to the tripping devices, the evaluating device being adapted to control the flow of electric current to each respective tripping device in response to the output signals generated by the acceleration sensor, the evaluating device also being coupled to the voltage source and to the electric storage device, the evaluating device being further adapted to determine whether the electric storage device is defective, and to disconnect the electric storage device from the restraining devices in response thereto;

a plurality of timing elements, each timing element being coupled between the evaluating device and a respective tripping device, each timing element permitting electric current to pass to the respective tripping device for a predetermined period of time to actuate the tripping device; and a temperature sensor coupled to the evaluating device and to the timing elements, the temperature sensor generating output signals indicative of the ambient temperature thereof, and the timing elements being adapted to permit electric current to flow through the respective tripping devices for a predetermined period of time based thereon.

7. An apparatus for actuating a passenger restraint device on a motor vehicle, comprising:

an acceleration sensor mounted on the motor vehicle for generating output signals indicative of the acceleration thereof;

a plurality of tripping devices, each tripping device being coupled to a respective passenger restraint device, each tripping device being actuated by the passage of electric current therethrough to actuate the respective passenger restraint device;

a voltage source coupled to each tripping device to provide electric current thereto to actuate the respective tripping device;

an electric storage device coupled to the voltage source and to each tripping device, the electric storage device being adapted to receive electric energy from the voltage source and to provide electric current to each tripping device to actuate the respective tripping device;

a control unit coupled to the acceleration sensor, the tripping devices, the voltage source, and the storage device, the control voltage source, and the storage device, the control unit receiving the output signals generated by the acceleration sensor and being adapted to control the flow of electric current to each respective tripping device in response thereto, the control unit being further adapted to determine if the storage device is defective, and, if so, to interrupt the flow of electric current from the storage device to the tripping devices, and to direct the electric current from the voltage source to a respective tripping device to actuate the tripping device; and first means coupled to the control unit for permitting electric current to flow through each respective tripping device for a predetermined period of time to actuate the tripping device.

8. An apparatus as defined in claim 7, wherein the voltage source is the vehicle battery;

the electric storage device is a capacitor; and the first means includes a plurality of timing units, each timing unit being coupled to the control unit and to a respective tripping device t permit electric current to flow through the tripping device for predetermined period of time.

9. An apparatus as defined in claim 8, further comprising;

a plurality of switches, each switch being coupled to the control unit between a timing unit and a respective tripping device, each switch being actuated by the control unit for a predetermined period of time in response to the respective timing unit to permit electric current to flow through the respective tripping device.

10. An apparatus as defined in claim 8, further comprising:

a volt meter coupled to the capacitor and to the control unit, the volt meter generating output signals to the control unit indicative of the voltage across the capacitor, the control unit in turn determining if the capacitor is defective in response thereto.

11. An apparatus for actuating a passenger restraint device on a motor vehicle, comprising:

an acceleration sensor mounted on the motor vehicle for generating output signals indicative of the acceleration thereof;

a plurality of tripping devices, each tripping device being coupled to a respective passenger restraint device, each tripping device being actuated by the passage of electric current therethrough to actuate the respective passenger restraint device;

a voltage source coupled to each tripping device to provide electric current thereto to actuate the respective tripping device;

an electric storage device coupled to the voltage source and to each tripping device, the electric storage device being adapted to receive electric energy from the voltage source and to provide electric current to each tripping device to actuate the respective tripping device;

a control unit coupled to the acceleration sensor, the tripping devices, the voltage source, and the storage device, the control unit receiving the output signals generated by the acceleration sensor and being adapted to control the flow of electric current to each respective tripping device in response thereto, the control unit being further adapted to determine if the storage device is defective, and, if so, to interrupt the flow of electric current from the storage device to the tripping devices, and to direct the electric current from the voltage source to a respective tripping device to actuate the tripping device;

first means coupled to the control unit for permitting electric current to flow through each respective tripping device for a predetermined period of time to actuate the tripping device; and second means coupled to the first means for measuring the ambient temperature of the storage device and generating output signals to the first means indicative thereof, the first means in turn basing the predetermined period of time thereon.

12. A method of actuating a passenger restraint apparatus on a motor vehicle, the apparatus including a plurality of tripping devices, each tripping device being coupled to a respective passenger restraint device, a voltage source, and a storage device, the storage device being coupled to the voltage source to receive electrical energy therefrom, each tripping device being actuated by passing electric current therethrough to in turn actuate the respective passenger restraint device, comprising the following steps:

checking if the storage device is defective;

if the storage device is defective, interrupting the flow of electric current from the storage device to the tripping devices; and passing electric current from the voltage source to a respective tripping device for a predetermined period of time to actuate the tripping device and, in turn, actuate the respective passenger restraint device.

13. A method as defined in claim 12, wherein the predetermined period of time is the same for each respective tripping device.

14. A method of actuating a passenger restraint apparatus on a motor vehicle, the apparatus including a plurality of tripping devices, each tripping device being coupled to a respective passenger restraint device, a voltage source, and a storage device, the storage device being coupled to the voltage source to receive electrical energy therefrom, each tripping device being actuated by passing electric current therethrough to in turn actuate the respective passenger restraint device, comprising the following steps:

checking if the storage device is defective;

if the storage device is defective, interrupting the flow of electric current from the storage device to the tripping devices;

passing electric current from the voltage source to a respective tripping device for a predetermined period of time to actuate the tripping device and, in turn, actuate the respective passenger restraint device;

measuring the ambient temperature of the storage device; and selecting the predetermined period of time based thereon.

15. A method of actuating a passenger restraint apparatus on a motor vehicle, the apparatus including a plurality of tripping devices, each tripping device being coupled to a respective passenger restraint device, a voltage source, and a storage device, the storage device being coupled to the voltage source to receive electrical energy therefrom, each tripping device being actuated by passing electric current therethrough to in turn actuate the respective passenger restraint device, comprising the following steps:

checking if the storage device is defective;

if the storage device is defective, interrupting the flow of electric current from the storage device to the tripping devices; and passing electric current from the voltage source to a respective tripping device for a predetermined period of time to actuate the tripping device and, in turn, actuate the respective passenger restraint device, wherein the predetermined period of time is varied depending upon the respective tripping device.

16. An apparatus for actuating a passenger restraint device on a motor vehicle, comprising:

a voltage unit;

an electrical storage unit coupled to the voltage unit to receive electrical energy therefrom;

a plurality of tripping devices, each tripping device being coupled to a respective passenger restraint device, the voltage unit and the electrical storage unit, each tripping device being actuated by the passage of electric current therethrough to, in turn, actuate the respective passenger restraint device;

first means coupled to the electrical storage unit for checking if it is defective and for generating signals indicative thereof; and second means coupled to the first means for interrupting the flow of electric current from the electric storage device to the tripping devices in response to the signals generated by the first means, and for directing electric current from the voltage source to a respective tripping device for a predetermined period of time to actuate the tripping device and, in turn, actuate the respective passenger restraint device.

17. An apparatus as defined in claim 16, wherein the second means includes a plurality of timing units, each timing unit being coupled between the first means and a respective tripping device to permit electric current to flow through the respective tripping device for a predetermined period of time.

18. An apparatus as defined in claim 17, wherein the second means further includes a control unit coupled to each timing unit, and a plurality of switches, each switch being coupled to the control unit between a respective timing unit and a respective tripping device, the control unit being adapted to actuate the switches to control the flow of electric current to a respective tripping device.

19. An apparatus as defined in claim 18, wherein the first means includes a volt meter coupled to the storage device and to the control unit, the volt meter transmitting signals to the control unit indicative of the voltage across the storage device, the control unit being adapted to compare the signals to a threshold value and, if the signals are below a threshold value, to interrupt the flow of electric current from the storage device to the tripping devices.

* * * * *

UNITED STATES PATENT AND TRADEMARK OFFICE
CERTIFICATE OF CORRECTION

PATENT NO. : 5,068,640
DATED : November 26, 1991
INVENTOR(S) : Burger et al.

It is certified that error appears in the above-identified patent and that said Letters Patent is hereby corrected as shown below:

Column 8, lines 15, 16, delete "the control voltage source, and the storage device";

Column 8, line 37, change "t" to --to--.

Signed and Sealed this

Twenty-third Day of November, 1993

Attest:

BRUCE LEHMAN

Attesting Officer

Commissioner of Patents and Trademarks